June 30, 1931. C. A. FLEMING 1,812,825
LUBRICATION SYSTEM FOR SLEEVE VALVE ENGINES
Filed March 16, 1927 2 Sheets-Sheet 1
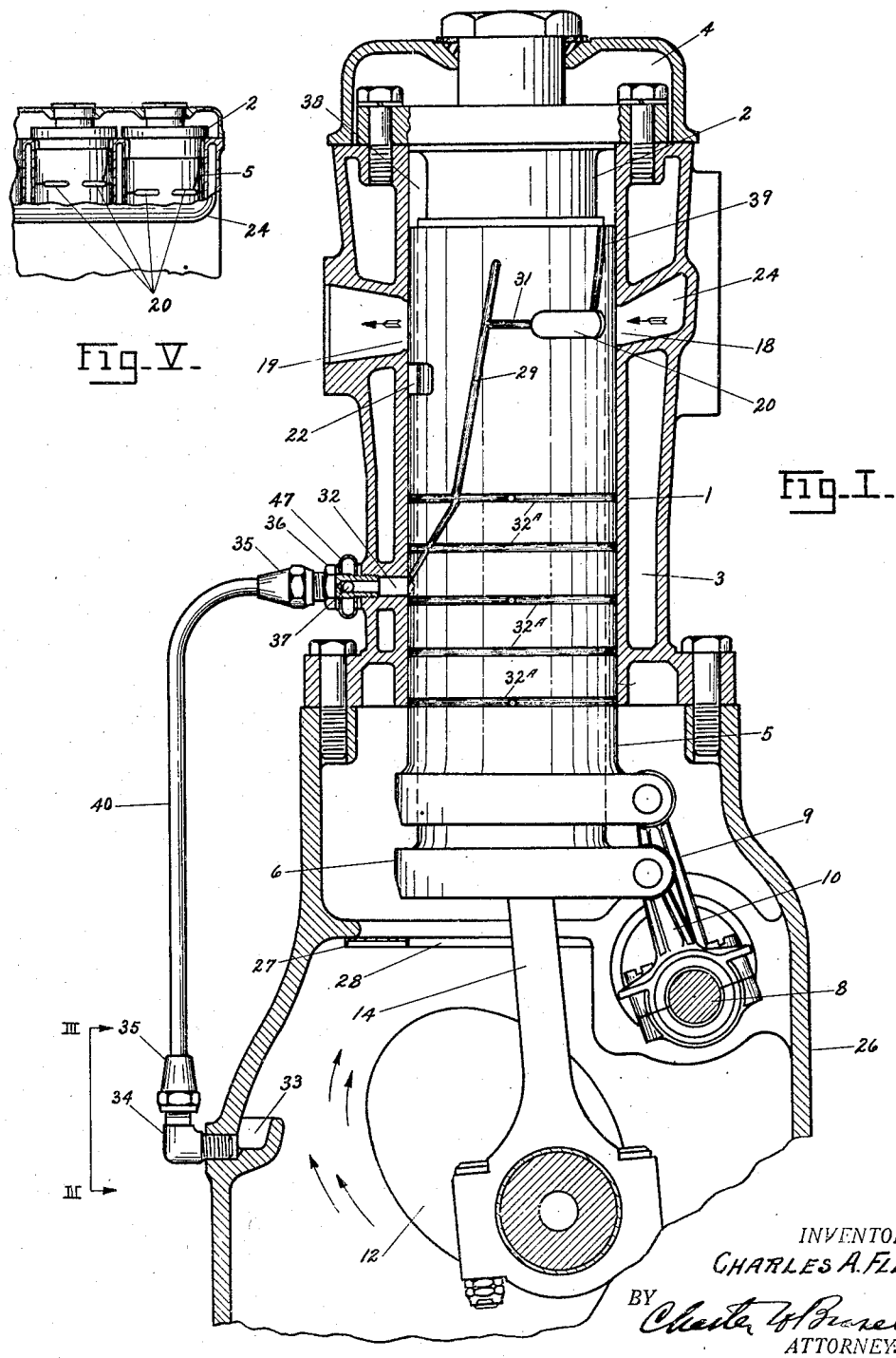
INVENTOR.
CHARLES A. FLEMING.
BY
ATTORNEY.

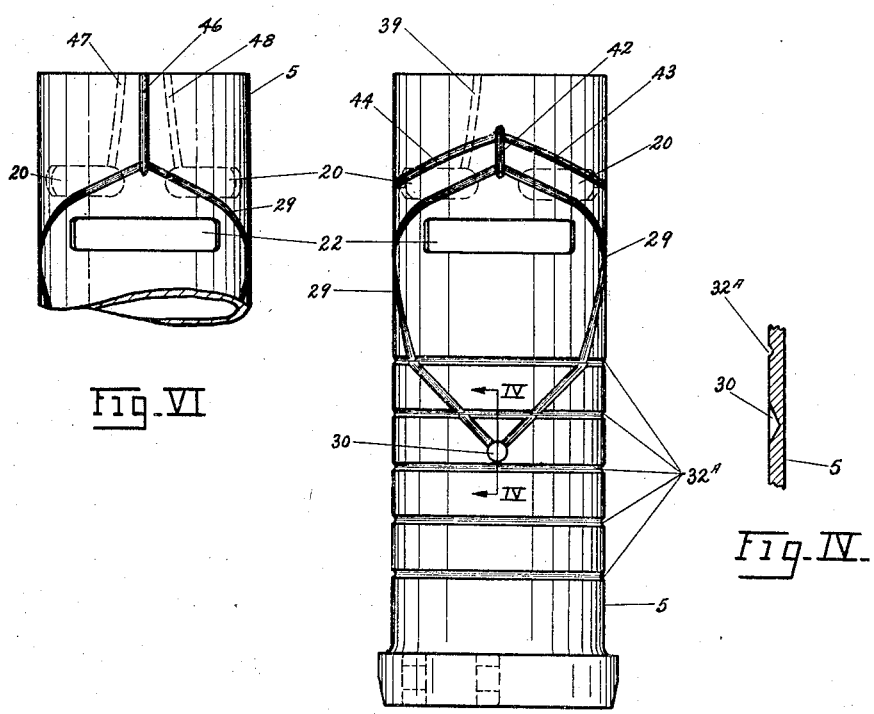
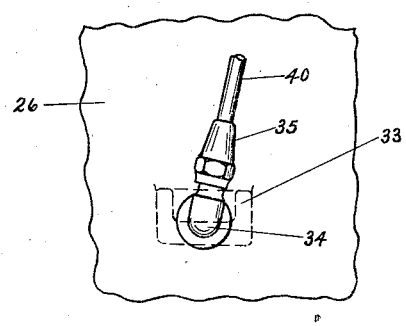

Patented June 30, 1931

1,812,825

UNITED STATES PATENT OFFICE

CHARLES A. FLEMING, OF PONTIAC, MICHIGAN, ASSIGNOR TO THE WILLYS-OVERLAND COMPANY, OF TOLEDO, OHIO, A CORPORATION OF OHIO

LUBRICATION SYSTEM FOR SLEEVE VALVE ENGINES

Application filed March 16, 1927. Serial No. 175,728.

This invention relates to lubricating of internal combustion engines and more particularly to the lubrication of sleeve valve engines.

One of the objects of the invention is to provide an efficient means for lubricating the valve sleeves of internal combustion engines whereby the sleeves, especially that portion adjacent the exhaust ports, are adequately lubricated and at the same time such excess of lubricant as may cause the engine to smoke is avoided.

Another object of the invention is to provide a sleeve valve engine with a means for supplying lubricant directly to the valve sleeve surfaces.

A further object of the invention is to provide a sleeve valve engine which will be adequately lubricated at low engine speeds.

Another object of the invention is to provide a system of direct lubrication to the sleeves which will be regulated by the intake suction of the engine. These together with other objects will appear from the description to follow, in conjunction with which, for the purposes of the present application, I have illustrated embodiments of the invention in the accompanying drawings which may be preferred in which Figure I is a front elevation, partly in section, of an engine illustrating the sleeve in substantially its lowest or intake position.

Fig. II is an elevational view of the exhaust side of a sleeve valve embodying certain modifications over that illustrated in Fig. I.

Fig. III illustrates the location of the oil pipe connection with reference to the oil trough.

Fig. IV is an enlarged sectional view of the sleeve wall taken on line IV—IV of Fig. II.

Fig. V is a side elevation partly in section and drawn to a smaller scale, of a portion of a multicylinder engine, showing a manifold common to a plurality of cylinders, and Fig. VI is an elevational view of the exhaust side of a sleeve embodying certain modifications over that illustrated in Figs. I and II.

In the drawings are illustrated the principal elements of a Knight engine consisting of an engine cylinder 1, closed by the depending head 2 equipped with a junk ring (not shown) and surrounded by cooling spaces 3 and 4. Within cylinder 1 are two reciprocating sleeves 5 and 6, which are driven by means of an eccentric shaft 8 through rods 9 and 10 respectively. The inner sleeve 6 preferably of standard design, is the working barrel of the engine, within which is a piston (not shown), which drives a crankshaft 12 through its connecting rod 14. As shown, cylinder 1 is provided with an inlet port 18 and exhaust port 19, which periodically register with the sleeve inlet ports 20 and exhaust port 22. The cylinder inlet port 18 communicates with an intake manifold 24 which is common to all cylinders of the engine as shown in Fig. V. A crankcase 26 supports the cylinders 1, houses the rotating parts and also provides the usual storage space for a lubricant supply. The engine described thus far is well known in the art and need not be set forth in greater detail as it is of generally understood construction and operation.

Sleeve valve engines, of the type above described, are subject to characteristic oiling troubles, the elimination of which is one object of this invention. Under certain conditions the tendency of the engine is to over-oil, because of an excessive amount of oil being thrown onto the sleeves from the connecting rod 14. This may be corrected by the addition of a suitable baffle 27, interposed between the lower end of rod 14 and the open ends of the cylinder 1 and sleeves 5 and 6, but the use of the baffle results in an inadequate amount of oil being supplied to the sleeves at low engine speeds since under low speed conditions sufficient oil does not pass through the baffle opening to obviate scoring of the sleeves. In the present invention the low speed lubrication of the sleeves is secured by an auxiliary oiling device, the oil being drawn onto the sleeve surface by engine suction, which is usually greater at low speeds because of the use of the customary throttle valve (not shown) for controlling the engine speed.

As illustrated in Fig. I, the improved oiling system includes passages or grooves 29 which extend in opposite directions from an indenture or vertical groove 30 preferably on the exhaust side of the sleeve, toward the inlet ports 20, a direct connection being made with the ports by means of short grooves 31. The grooves 29 may be connected directly with ports 20, if desired, but it has been found that the form of grooving shown in Fig. I produces satisfactory results. The customary distribution grooves 32A having apertures communicating with the inner sleeve, are also included in the preferred embodiment. An opening 32 is formed in the wall of cylinder 1 below the exhaust port 19 so as to be in the line of movement of depression 30, and is preferably so located that the depression 30 aligns with the opening 32 when the sleeve inlet port 20 is in registration with the cylinder port 18 and in position to permit a charge to be drawn into the cylinder by the descending piston (not shown). The manifold 24 is common to a number of cylinders, as shown in Fig. V, consequently suction is transmitted from both the interior of cylinder 1 and the manifold 24 to the opening 32, by way of grooves 29 and 31. It should be noted that suction is produced by the normal working of each cylinder, and that in a multicylinder engine such as shown in Fig. V this suction will be transmitted to the common manifold 24.

The interior wall of the crankcase 26 is provided with a trough 33 which is adapted to catch lubricant that is splashed by the connecting rod 14 or crankshaft 12 as indicated by the arrows, the lubricant being thrown either directly into the trough or draining therein from the interior wall of the crankcase 26. A pipe 40 connects trough 33 with opening 32 by any suitable means, such as connections 34, 25 and 26, and an oil manifold 47 is provided, which is common to all cylinders, connection being established by means of a hole 37 in each of the connections 36.

The annular space 38 above sleeves 5 and 6 is connected preferably, to port 20 by means of groove 39 for transmitting suction to the space, from the manifold, in the same manner as it is transmitted to opening 32.

In the embodiment illustrated in Fig. I, it will be observed that oil which distributes itself over the upper surface of the sleeves from the channel 29 finally collecting in chamber 38, is drained therefrom through channel 39 which serves the additional function of reducing the pressure within the chamber. As a modification of this embodiment, I extend the channel 29 upwardly to the annular space 38 and omit the passage 31. In such constructions, oil tends to be drawn to the top of the sleeves by reason of the existence of a partial vacuum in the space 38 created and maintained by reason of the duct 39 which interconnects the space with the manifold 24. This embodiment is characterized by the fact that oil may be drawn to the top of the sleeve without danger of being directly into the combustion chamber each time the inlet ports are brought into alignment.

An additional modified form for accomplishing exhaust port lubrication is illustrated in Fig. II. According to this embodiment the ducts 29 are united after circling the exhaust port 22 and are extended upwardly as a single duct or channel 42 above the discharge port. The channel 42 in turn branches out into two ducts 43 and 44 which connect the channel 42 with the intake port openings 20 on the opposite side of the sleeve. In other respects the sleeve resembles that described previously in connection with Fig. I. This embodiment assures adequate lubrication of the sleeve in the region of the discharge port which is most susceptible to scoring by reason of the high temperatures of the exhaust gases.

Fig. VI differs in some respects from the embodiment illustrated in either Figs. I or II in that the channels 29 are united to form a common channel 46 which corresponds in some respects to channel 42 in Fig. IV, but differs from that embodiment in that it extends directly to the top of the sleeve. Passage of oil through the channel is assured by the partial vacuum which is maintained in the space above the sleeves through the agency of channels 47 and 48 that interconnect both of the inlet ports with the space 38.

It will be understood, of course, that the manner of lubricating the sleeves which is disclosed herein is not limited to a two sleeve valve engine, but may properly be extended to other engines which come within the same broad class. It will further be understood that the invention is not limited to embodiments containing an auxiliary reservoir such as is indicated by numeral 33, but may be extended to others, as for example, those wherein the oil is drawn directly from the main reservoir or crankcase. Under such conditions, the lubrication of the valves would be independent of any splash or mist, which is created by the revolutions of the crankshaft, nor would adequate lubrication be dependent upon the presence or absence of baffle plates.

From the description of the structures hereinabove set forth, the operation of the oiling system will readily be apparent. Thus when the engine illustrated in Fig. I is operated at a rapid rate, a sufficient amount of oil passes through the restricted opening created by the baffle, to lubricate the sleeves. At the same time the partial vacuum in the intake manifold is too small to draw oil through the auxiliary oiling system. Accordingly, the sole source of lubrication is that derived from the oil spray. When, however, the engine is idling or travelling at a low rate of speed, the partial vacuum in the manifold is increased materially and at the same time the amount of oil spray in the crankcase is materially lessened, necessitating additional oil in order to assure adequate lubrication. Under these conditions, the oil will be drawn from the auxiliary reservoir or receptacle 33 through the pipe 40 and will be distributed about the surface of the sleeve by means of capillary attraction and the channel ducts 29 and 32-A.

While there is illustrated and described but a single complete embodiment of my invention together with several minor modifications, it will be apparent to those skilled in the art that the invention is not limited to the particular embodiments described, but is susceptible to numerous modifications without departing from its scope and I desire therefore that it be limited only to accord with the prior art and the appended claims.

I claim:

1. In an internal combustion engine, a cylinder having an opening therein, a crankcase, a reciprocating valve sleeve within said cylinder having an intake port, and provided with a passageway communicating with said intake port and adapted to register with said cylinder opening, and a conduit between said cylinder opening and the interior of said crankcase for conducting lubricant to said opening.

2. In an internal combustion engine, a cylinder having an opening therein, a reciprocating valve sleeve within said cylinder having an intake port, and provided with a passageway on said sleeve communicating with said port and adapted to register with said cylinder opening, and means for conducting lubricant to said cylinder opening.

3. In an internal combustion engine, a cylinder having an opening therein, a crankcase, a reciprocating valve sleeve within said cylinder having an intake port, and provided with a passageway communicating with said port and adapted to register with said opening when said sleeve intake port and said cylinder intake port are in registration, and means for conducting lubricant to said cylinder opening from said crankcase.

4. In an internal combustion engine, a cylinder, a crankcase having a trough adapted to retain oil deposited therein, a reciprocating valve sleeve within said cylinder having an intake port, said cylinder having an opening therein adjacent said sleeve, means forming a passageway on said sleeve communicating with said intake port and adapted to register with said cylinder opening, and a conduit between said cylinder opening and said oil trough.

5. In an internal combustion engine, a cylinder having an intake port, a crankcase having a trough adapted to retain oil deposited therein, a reciprocating valve sleeve within said cylinder, said cylinder having an opening therein adjacent said sleeve, means forming a passageway on said sleeve communicating with said sleeve port, said passageway being adapted to register with said opening when said sleeve port and said cylinder port are in registration, and means for conducting oil from said trough to said cylinder opening.

6. In an internal combustion engine, a cylinder, a crankcase having a trough adapted to retain oil deposited therein, a reciprocating valve sleeve within said cylinder having an intake port, said cylinder having an opening therein adjacent said sleeve, means forming a passageway on said sleeve communicating with said port and adapted to register with said opening, said crankcase having an opening through the wall thereof communicating with said trough, and a conduit forming a connection between said crankcase opening and said cylinder opening.

7. In an internal combustion engine having a crankcase and an open end sleeve and an oil baffle therefor, the combination of a sleeve oiling device, comprising an oil trough within said crankcase, an oil conduit communicating with said trough, and means forming a passageway on said sleeve adapted to transmit engine intake suction to said oil trough.

8. In an internal combustion engine, a cylinder, a reciprocating valve sleeve within said cylinder having an intake and an exhaust port in substantially opposite sides thereof, means forming a passageway on said valve sleeve communicating with said intake port and extending toward the opposite side to a point beneath the exhaust port, said cylinder having an opening therein adjacent the exhaust side of said sleeve adapted to register with said groove, and means for supplying lubricant to said cylinder opening.

9. In an internal combustion engine, a cylinder, a crankcase, a reciprocating valve sleeve within said cylinder having an intake and an exhaust port in substantially opposite sides thereof, means forming a passageway communicating with said intake port and extending toward the opposite side thereof to a point beneath the exhaust port, said cylinder having an opening therein adjacent the exhaust side of said sleeve adapted to register with said groove, and an oil conduit connecting said opening with the interior of the crankcase.

10. In an internal combustion engine, a crankcase, a cylinder, a reciprocating sleeve valve therein having an intake port and an exhaust port in substantially opposite sides thereof, means forming a passageway on said sleeve communicating with said intake port and extending toward the opposite side thereof to a point beneath the exhaust port, said cylinder having an opening therein adjacent said sleeve on the exhaust side thereof, said crankcase having a trough adapted to retain oil deposited therein, and an oil conduit connecting said opening and said trough.

11. A valve sleeve for an internal combustion engine, said sleeve having an intake port, and means forming a passageway on said sleeve communicating with said port and extending downwardly from said port to a point adjacent the lower end of said sleeve, said groove being adapted to conduct lubricant toward said port.

12. A valve sleeve for an internal combustion engine, said sleeve having an intake port and an exhaust port on substantially opposite sides thereof, means forming a passageway on said sleeve communicating with said intake port and extending toward the opposite side thereof to a point beneath said exhaust port, and said groove being adapted to carry lubricant from said exhaust side toward said intake port.

13. In an internal combustion engine, the combination of a cylinder having an intake port, a reciprocating valve sleeve within said cylinder having an intake port, said cylinder having an opening therein adajcent said sleeve, said sleeve having a passageway thereon in communication with said sleeve port and adapted to register with said opening when said sleeve port and said cylinder port are in registration, said passageway being adapted to be out of registration with said opening when said sleeve port and said cylinder port are out of registration, and means for supplying lubricant to said cylinder opening.

14. In an internal combustion engine, a cylinder, a reciprocating sleeve within said cylinder, a depending head secured to said cylinder and forming an annular space therewith above said sleeve, said sleeve having an intake port, said cylinder having an opening therein adjacent said sleeve, means forming a passage on said sleeve communicating with said intake port and adapted to register with said opening, means forming a second passageway between said intake port and the space above said sleeve, and means for supplying lubricant to said opening whereby it may be drawn upward by engine suction toward said port and distributed on said sleeve by the engine suction in said annular space.

15. An internal combustion engine comprising a cylinder including a crankcase having a supply of oil therein, a reciprocating piston adapted to maintain a partial vacuum in the intake zone of the cylinder; sleeve valves intermediate the cylinder and the piston operated in synchronized relation with the piston; and an oiling system for the valve sleeves of the engine consisting of an auxiliary oil receptacle in communication with the crank case and means whereby fluid communication is established between the receptacle and the intake zone, the sleeves being disposed intermediate the receptacle and intake zone and in the path of the oil communicating means.

16. An internal combustion engine comprising a cylinder, a main oil reservoir, an auxiliary oil receptacle, a reciprocable piston disposed therein adapted to create a partial vacuum in the intake chamber of the engine; sleeve valves disposed intermediate the piston and cylinder having a channeled surface, and means whereby communication is established between the auxiliary oil receptacle and the intake chamber by way of the channels in the sleeves.

17. In an internal combustion engine of the reciprocating sleeve valve class, a lubrication system for the sleeves thereof comprising a reservoir of lubricant, a zone of reduced pressure beyond the top of the sleeves, means forming a passageway for lubricant interconnecting the reservoir with the zone of reduced pressure, said passageway having a portion extending from the reservoir to the sleeve and another portion formed on the sleeve surface extending to the upper extremities thereof, and being adapted to distribute lubricant over the sleeve surface.

In testimony whereof I affix my signature.

CHARLES A. FLEMING.